United States Patent
Lee et al.

(10) Patent No.: US 8,401,931 B2
(45) Date of Patent: Mar. 19, 2013

(54) TEST MACHINE FOR AN AUTOMATED LIGHT

(75) Inventors: Robin Lee, Hamburg, NJ (US); Chris Conti, West New York, NJ (US)

(73) Assignee: Production Resource Group, LLC, New Windsor, NY (US)

( * ) Notice: Subject to any disclaimer, the term of this patent is extended or adjusted under 35 U.S.C. 154(b) by 300 days.

(21) Appl. No.: 12/767,037

(22) Filed: Apr. 26, 2010

(65) Prior Publication Data

US 2010/0268625 A1 Oct. 21, 2010

Related U.S. Application Data

(62) Division of application No. 11/672,873, filed on Feb. 8, 2007.

(60) Provisional application No. 60/772,012, filed on Feb. 9, 2006, provisional application No. 60/801,303, filed on May 17, 2006, provisional application No. 60/864,120, filed on Nov. 2, 2006.

(51) Int. Cl.
*G06Q 10/00* (2012.01)
(52) U.S. Cl. .................. 705/28; 362/85; 340/270.11
(58) Field of Classification Search .............. 705/22; 362/85; 340/270.11
See application file for complete search history.

(56) References Cited

U.S. PATENT DOCUMENTS

| | | | | |
|---|---|---|---|---|
| 5,329,431 A | * | 7/1994 | Taylor et al. | 362/85 |
| 5,940,204 A | * | 8/1999 | Hewlett | 359/298 |
| 5,969,485 A | * | 10/1999 | Hunt | 315/292 |
| 6,211,627 B1 | * | 4/2001 | Callahan | 315/294 |
| 7,132,804 B2 | * | 11/2006 | Lys et al. | 315/292 |
| 7,272,519 B2 | * | 9/2007 | Lesesky et al. | 702/63 |
| 7,911,359 B2 | * | 3/2011 | Walters et al. | 340/870.11 |
| 2004/0155609 A1 | * | 8/2004 | Lys et al. | 315/292 |
| 2004/0178257 A1 | * | 9/2004 | Jeffery | 235/375 |
| 2007/0027643 A1 | * | 2/2007 | Lesesky et al. | 702/60 |
| 2007/0085701 A1 | * | 4/2007 | Walters et al. | 340/870.02 |
| 2008/0074253 A1 | * | 3/2008 | Jeffery | 340/539.11 |
| 2009/0037301 A1 | * | 2/2009 | Powell | 705/28 |

* cited by examiner

*Primary Examiner* — Scott Zare
*Assistant Examiner* — Talia Crawley
(74) *Attorney, Agent, or Firm* — Law Office of Scott C. Harris, Inc.

(57) ABSTRACT

A moving light tester includes plural sensors, each of which can test a function of the moving light. A conveyor can move the light between the sensors. Once tested, information about the test is used to characterize the light, to determine if it needs repair, or can be re rented. The information can also be used to create inventory lists, and bills for damage. The testing can include automated testing for gobos, colors, noise, heating and movement, or other tests.

22 Claims, 2 Drawing Sheets

TEST MACHINE FOR AN AUTOMATED LIGHT

CROSS-REFERENCE TO RELATED APPLICATIONS

This application claims priority to U.S. Provisional Application Nos. 60/772,012 filed Feb. 9, 2006, 60/801,303 filed May 17, 2006 and 60/864,120 filed Nov. 2, 2006. The disclosure of the prior applications are considered part of (and are incorporated by reference in) the disclosure of this application.

BACKGROUND

Automated lights, such as moving lights, are often used as lighting for events. These events are often only ongoing for limited times, and the events, and hence the lights, may travel between different locations. Accordingly, the lights are often hired on a rental basis, to use for the different events. At the end of the event, the lights are returned to the rental company.

Once returned, the lights must be returned to stock. Then, when the lights are needed again, they must be rented again. There are difficulties with ensuring that lights in stock are in proper states of repair, and are properly inventoried.

The way in which these lights are tested upon return is inconsistent. Some people may simply turn the lights on or simply manually or visually inspect them. In addition, the whole process of unpacking testing and adding to stock takes substantial amounts of time, and can be substantially affected by human error.

SUMMARY

The present application describes a moving light test system, which uses an automated technique. The automated technique carries out certain kinds of tests on the moving light, and enables automatically determining certain characteristics of the light that indicate whether it is ready for re-rental, as well as maintaining certain inventories of the light.

DETAILED DESCRIPTION

Figure 1:
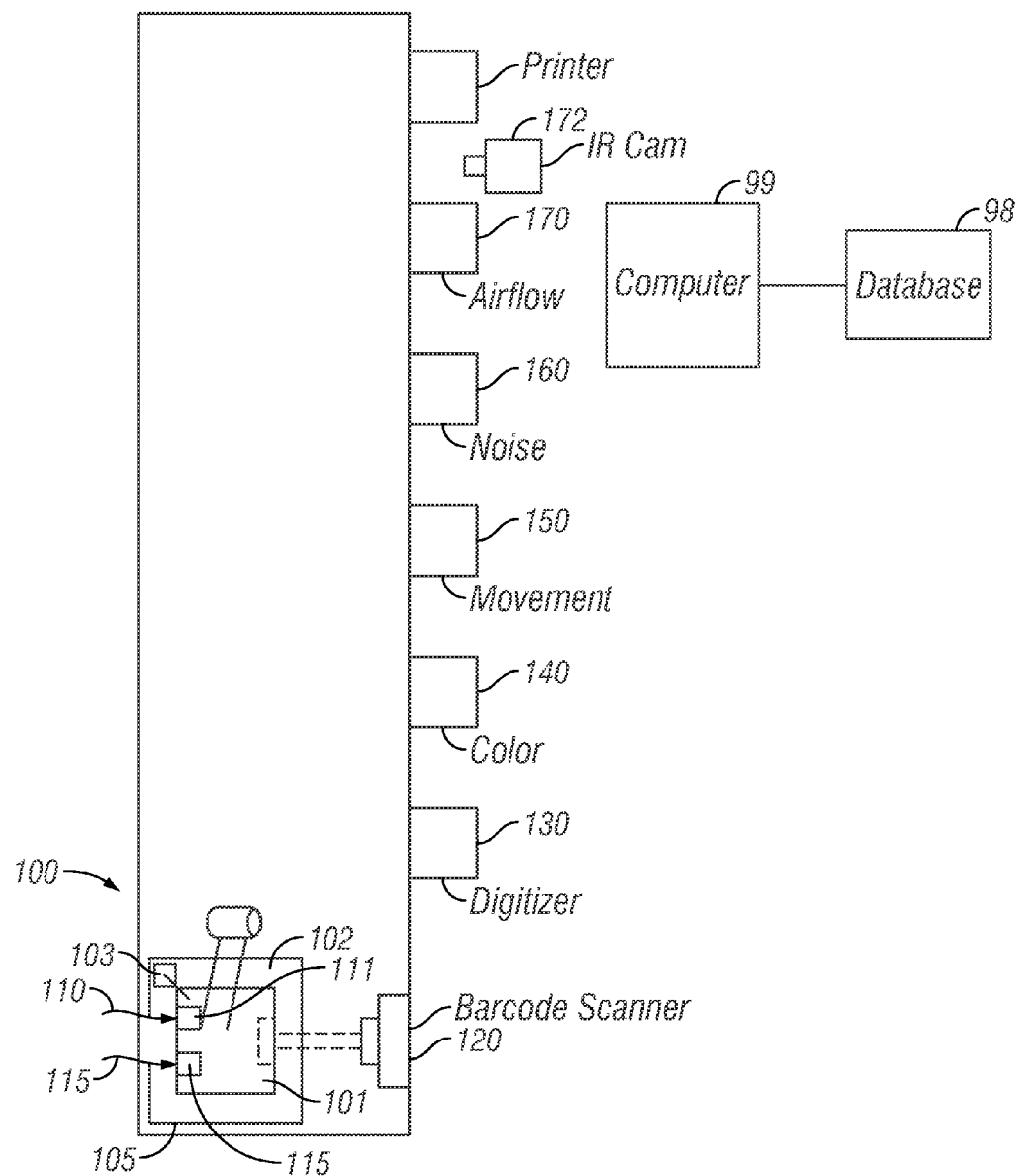
FIG. 1 shows a conveyor with stations for testing incoming lights.

The general structure and techniques, and more specific embodiments which can be used to effect different ways of carrying out the more general goals, are described herein.

According to an embodiment, automated lights are received from a rental return, and automatically tested according to an automated moving light test system 100. The system 100 in the embodiment may include a conveyor which moves the lights between different stations. A conveyor may allow a number of different test elements to operate on each light. However, it should be alternatively understood that a single station may be used, or a plurality of stations, where each station allows many of these same operations. The light is initially placed or connected on to the conveyor. In an embodiment, each light is first screwed to a mechanical board 102, called a 'boogie board', which may be a wooden board that is larger than the light. The boogie board 102 may have attachment holes or mechanisms The boogie board 102 also have connectors 103 which attach to the light 102. The connections terminate in generic connectors 111, 116, which provide power and data 115. Corresponding power and data connections are made via wires 110, 115 at locations along the conveyor. Alternatively a single cable/connector can be used. Also alternatively, the cables may be long enough to pass to any location on the conveyor, or alternatively may move with the conveyor to the various different locations. As an alternative, connectors may be located adjacent to multiple different stations.

Figure 2:
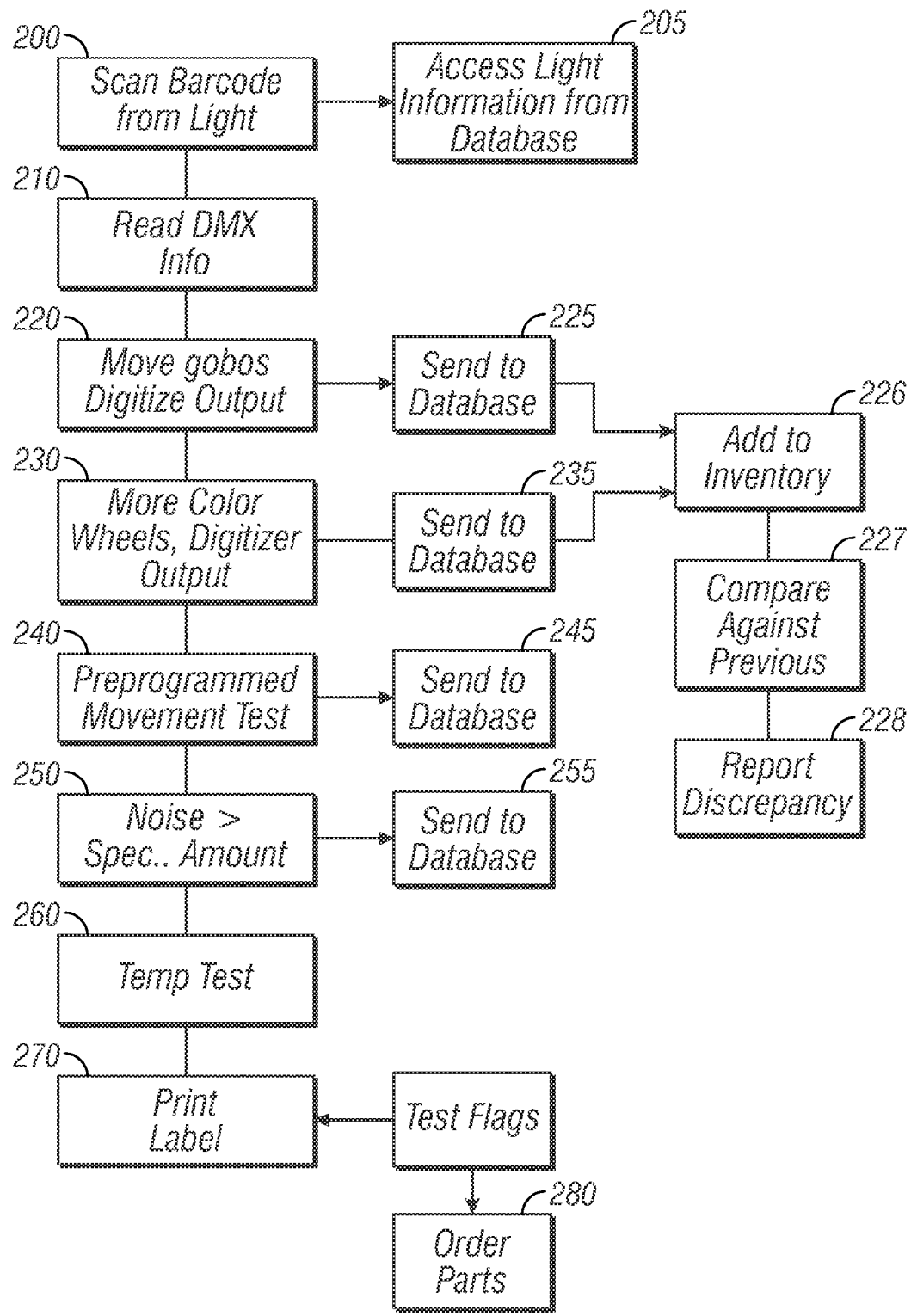
FIG. 2 shows a flowchart of operation of the different structures.

Each of the different elements is connected to a central controlling computer 99 which maintains information indicative of the different lights, and which runs the test routine in the flowchart in FIG. 2. Different parts of this flowchart may require actuation of the different hardware along the conveyor, or alternatively receiving input from the different hardware along the conveyor.

Another embodiment has multiple test systems that are fixture-specific for a specified fixture.

At 200, the light is initially processed by scanning its inventory barcode with a barcode scanner 120. The barcode scanner 120 can be mounted along the device, or can be handheld. Once scanned, the scanned information is sent to the computer 99, which retrieves at 205 information about the light 101, including its history, and data indicative of the model of the light.

The fixture-in date/time is added to the database is added to the database at 205; and a test time may also be added.

After scanning and connection to the database, and after power and signal have been applied, the DMX information from the light is read at 210. This may, for example, use a test detection, or can simply read DMX status or DMX error codes.

After this initial operation at the scanning station 120, the light is moved to the digitizer 130. The digitizer 130 operates according to step 220 to command movement of the gobos on the light, and to digitize the output produced by each gobo. For example, the digitizer may include a camera that automatically identifies each gobo or template within the light. The camera may use a pattern recognition or marking recognition system to compare each gobo against patterns indicative of the gobo.

Once the gobos are recognized, the gobos and their positions are stored. This information is then sent to computer 99 at 225. In addition, computer 99 gives each gobo type a separate record as part of the inventory.

226 shows gobo types being added to inventory individually, as well as being part of the light itself. This hence supports both in-the-fixture inventory as well as on-the-shelf inventory.

After adding to inventory, 227 compares the gobos that are in the light 101 against the gobos that were in the light when the light was initially rented. 228 includes reporting discrepancies between the gobo set at rental and the gobo set at return. One discrepancy report may simply be a bill to the renting customer for any missing gobos.

Any gobo in any light is automatically added to the overall inventory system. Therefore, if a user needs gobo number 312, the computer informs that that gobo 312 is in existence in the warehouse, and can also find any light in which gobo 312 is located.

The gobos may also become damaged during operation. For example, when glass gobos are used, the glass may become scratched. The gobos may be dented. The test may look for a substantial match, for example a match within somewhere between 70 and 100% between the desired shape and the actual shape. The match percentage may be different for different gobos.

In addition, the automated shape matching may specify certain criteria. For example, a gobo in the shape of a star may require that all of the points of the star be pointy. Any match of less than that amount may indicate more than the acceptable amount of damage.

After completion of the digitized output, the light 101 and is moved to the color station 140 which operates according to step 230 to move the color wheels and again digitize their output. The color wheels' output may be digitized according to, for example, color temperature or the like. Each color wheel may have its color filters characterized for color temperature, glass color, and other information. The set of color temperatures may be compared against the different color temperatures for each of a plurality of known color wheels that are in stock. A color wheel is established to be the wheel that has the closest set of color temperatures to the one being tested. Then, an error can be established when there is too much difference between the actual color and the specified color.

Similar to the above, color wheels and color filters may become scratched or may be damaged from the heat of the lamp projection. Eventually, the lamp projection causes burn out of the color. At 235, the color information is sent to the database, followed by the inventory routine 226, 227, 228. Again, color wheels are added to inventory, the content of the light is compared against previous light contents, and any discrepancies are reported or billed.

A movement test station 150 then receives the lights along the conveyor. The movement test is carried out at 240, where a pre-programmed movement test sequence is used to control the light, and the light's output beam is monitored by a light sensor to determine whether the light puts out the right kind of lights and movement responsive to the test. At 240, the beam output may also be tested; for example, the intensity of the beam may be tested, and also dimming and other aspects of the beam may be tested. During the test routine, all of the fixture attributes may be tested via test sensors. For example, the speed, responsiveness of pan, tilt, rotation, focus, zoom, lamp intensity, lamp color, and all special lamp fixture features may be tested in this way.

As part of the color information, a color matching system may be used. The database 98 may automatically maintain information indicative of the color from certain color filters. The database may reject color filters that differ from the reference by a certain level, or alternatively may find the closest match when a number of matched colors need to be presented. Since human perception is a very bad at color memory, this may be an efficient way to match between different lights.

The light should respond in specified ways. The results of the test are sent to the database at 245. In addition, if the light operates below a specified level, a movement test error flag is set, and sent to the database as part of the sending at 245.

The noise station at 160 may simply be a microphone which is placed near the light while it operates. 250 tests whether the noise is greater than a specified amount. Either the actual noise amount or a pass/fail indication may be sent to the database at 255. Different kinds of noise signatures may also be analyzed at this step. For example, known sound patterns may represent a specific problem with the light, and the sound patterns may be analyzed to determine if any of those node sound patterns are present. For example, motors of a specified type may emit a special kind of squeal or other sound when they are failing or about to fail.

Operation then continues by sending the light to the airflow station at 170, which tests air flow and temperature of the light at 260. The airflow test may use an airflow sensor which senses the amount of air that is passing through the light.

According to another embodiment, sensing may be carried out using an infrared camera shown as 172. The infrared camera uses the operating light to determine malfunctioning fans or clogged heating vents within the light. Any cooling discrepancy within the light will cause a portion of the light to become hotter. A hot portion will show in the output signal from the infrared camera.

The output signal from the infrared camera may be manually viewed by a user, where the sensor or camera detects the heat of the light and produces an image indicative thereof. The operator manually determines whether there are hotspots in the wrong places or whether the cooling location is actually receiving any cooling.

The result of the infrared camera may also be automatically detected. For example, the image from camera 172 is processed by computer 99. The computer can recognize the infrared signature to either recognize the light, or can use the information from the barcode scanner.

For each light, the computer has a list of maximum allowable temperatures in specified locations. If any part of the lamp is hotter than its specified maximum, the lamp may be marked as being defective. Similarly, the cooled location may have a relatively low hotspot to determine if the cooling is working properly.

In addition, at 270, all of the tests have been completed, and the label may be printed at 270 indicating whether the light has passed the test, or needs repair. If repair is needed, the database may automatically order the parts, for example, at 280. In addition, any necessary repair is added to the lights overall history.

The end result is that the database includes a detailed inventory. It not only includes inventory of parts within the light, but also includes inventory of the lights, and test history of those lights. A global test history may also be maintained. For example, if all motors in a light of a specified time are failing consistently, at specified times, or at specified lifespans, or all the motors failed on a specified job, patterns like this might be able to be noticed.

As described above, all of this information can be used as part of both an in light inventory system and an in house inventory system. The testing carries out passive testing of the light parts as well as the lights themselves. Therefore, a user on the computer 99 may access the database 98 to automatically determine if specified lamps or parts are present.

If an order is received for 10 lamp x's, with 10 gobo y's, the database will be able to determine whether 10 lamp x's are present, as well as where the 10 gobo y's are present in any light in inventory.

One embodiment may allow some or all of the testing to be carried out in a heated chamber to simulate the operation after a specified amount of time when the light has heated up.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the above has described only some tests that can be carried out on the light, but it should be understood that many tests including more sophisticated and less sophisticated tests can be used. Pattern matching and pattern recognition can be used, but alternatively an operator can simply indicate a pass/fail indication as the light passes by and carries out the specified operations. Even with operator interaction of this type, the system provides significant advantages in its ability to maintain parts lists of known working parts within the database.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method comprising:
using a computer for determining information about an automated light;
using said computer for commanding the automated light to display at least a plurality of functions;
using the computer for testing the automated light to determine which individual parts, from among a group of plural different possible parts, are installed in said automated light, and to form a list of said individual parts that are determined to be installed in said light;
determining information in said computer indicative of whether the automated light has properly displayed said plurality of functions; and
storing said information about the automated light and said information indicative of whether the automated light has properly displayed said functions in said computer as changed data in said computer and maintaining an inventory list which includes information about the automated light that has been tested, and about said individual parts that are determined to be installed within the tested automated light, wherein said individual parts information includes an indication of a specific part that is one of multiple same function parts that are installed within the automated light, wherein the specific part has a same function as other different specific parts, but the specific part has different characteristics than the other different specific parts.

2. A method as in claim 1, wherein said determining information comprises automatically determining information about the automated light.

3. A method as in claim 1, further comprising, as part of said testing functions, testing said individual parts that are installed within the tested automated lights.

4. A method as in claim 1, wherein said individual parts include light shaping gobos, and said inventory list indicates which of a plurality of different gobos is installed in said automated light.

5. A method as in claim 3, wherein said individual lights include light changing color filters, and said inventory list includes which of a plurality of light changing filters is installed in said individual light.

6. A method as in claim 5, wherein said functions include a color filter, and wherein said testing includes testing said color of said filter to determine if its color matches with a specified color by a specified amount, and adding information indicative of whether said color matches to said inventory list.

7. A method as in claim 1, wherein said functions include at least pan and tilt movement of the automated light, and said testing comprises programming a preprogrammed sequence of movements into the light and determining if the light carries out said preprogrammed sequence of movements.

8. A method as in claim 1, wherein said functions include testing for noise.

9. A method as in claim 1, wherein said functions include testing for cooling.

10. A method as in claim 9, wherein said testing for cooling comprises testing for airflow.

11. A method as in claim 9, wherein said testing for cooling comprises determining infrared information indicative of the light, and using said infrared information to test for one of excess heat or inadequate cooling in specified locations.

12. A method as in claim 1, wherein said testing further comprises testing for missing parts in the light.

13. A method as in claim 12, further comprising comparing parts of the light during testing with parts of the light at a previous time, and creating information indicative of differences representing parts that were installed during said testing that were not installed at said previous time.

14. A method as in claim 1, further comprising automatically determining information about the light, and determining information indicative of proper operation of the light type.

15. A method comprising:
using a computer for determining information about an automated light;
using the computer for testing the light to determine which individual parts, from among a group of plural different possible parts, are installed in said light, and to form a list of said parts that are determined to be in said light;
one of said parts including a gobo, and further comprising as in claim 1, wherein said functions include a gobo shape, and wherein said testing includes testing said gobo to determine if a light shape output by said gobo to determine if said gobo shape matches with a specified stored gobo shape by a specified amount; and storing said information about said automated light and said information indicative of whether said gobo shape matches said stored gobo shape, in said computer as changed data in said computer.

16. A method as in claim 15, wherein said functions include a gobo, and further comprising automated testing for scratches on the gobo, and adding information indicative of said scratches on the gobo to said inventory list.

17. An apparatus comprising:
a controller that obtains information about replaceable parts that are within an automated light at a first time;
a memory that stores information about parts that were in the light at a previous time, which was previous to said first time; and
wherein said controller creates and stores information representing parts that were installed during said testing that were not installed at said previous time;
one of said parts including a gobo, said controller also testing said gobo to determine if a light shape output by said gobo matches with a specified stored gobo shape by a specified amount; and storing said information about said automated light and said information indicative of whether said gobo shape matches said stored gobo shape, in said computer as changed data in said computer.

18. An apparatus as in claim 17, wherein said controller also operates to command the automated light to display at least a plurality of functions and determines whether the automated light has properly displayed said plurality of functions and stores said information indicative of whether said automated light has properly displayed said functions.

19. An apparatus as in claim 18 further comprising a scanner wherein said determining information comprises automatically determining information about the automated light.

20. An apparatus as in claim 19, further comprising maintaining an inventory list which includes information about lights that have been tested, and about individual parts that are installed within the tested automated lights.

21. An apparatus as in claim 20, wherein said removable parts include light shaping gobos.

22. An apparatus as in claim 20, wherein said removable parts include light changing color filters.

* * * * *